Patented Aug. 11, 1936

2,050,971

UNITED STATES PATENT OFFICE 2,050,971

QUINOLINE COMPOUND

Heinrich Jensch, Frankfort-on-the-Main, Germany, assignor to Winthrop Chemical Company, Inc., New York, N. Y., a corporation of New York No Drawing. Application May 28, 1935, Serial No. 23,945. In Germany September 28, 1933

6 Claims. (Cl. 260—38)

The present invention relates to quinoline compounds.

I have found that new, therapeutically valuable quinoline compounds may be obtained by binding, in known manner, two primary or secondary diamino quinoline compounds of the formula

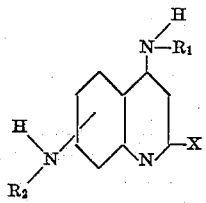

wherein $R_1$ stands for H or an alkyl group, $R_2$ for H or an alkyl group and X for H or a methyl group, at the amino group of the benzene nucleus by means of a substituted or unsubstituted alkylene group.

The same compounds may be obtained by introducing in known manner a primary or secondary amino group into both the 4-position and the 4'-position of amino quinolines of the formula

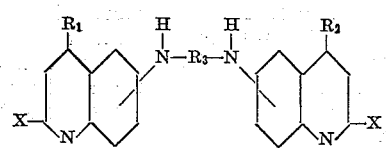

wherein X stands for H or methyl, $R_3$ for an alkylene radical with at least two carbon atoms, which if $R_3$ contains more than two carbon atoms, may contain still one hydroxyl group, and $R_1$ and $R_2$ stand for radicals being exchangeable by ammonia or primary amines (for instance halogen or alkoxy groups).

The new compounds may, for instance, be produced by causing alkylene halides to act upon diaminoquinolines as described, for instance, in my U. S. patent application Serial No. 653,192, filed January 23, 1933. It could not be foreseen that during this operation only the amino groups contained in the benzene nucleus would enter into reaction. Alkylene compounds which at first contain only one reactive group may also be caused to react with one molecular proportion of a diamino-quinoline and then with a second molecular proportion of a diaminoquinoline after a second reactive group has been introduced. It is furthermore possible to add one molecular proportion of a diaminoquinoline on an alkylene oxide which already previously contains a halogen or in the addition product of which a second reactive group has been produced, and then to cause a second molecular proportion of a diaminoquinoline to react. The reactions named may also be carried out with such aminoquinolines, containing an amino group in the benzene nucleus, as permit the subsequent introduction of a primary or secondary amino group into the 4-position by the usual methods.

The two quinoline nuclei may be substituted in 2-position by methyl. There may also be used the quinolines unsubstituted in 2-position. As alkylene radicals there may, for instance, be named

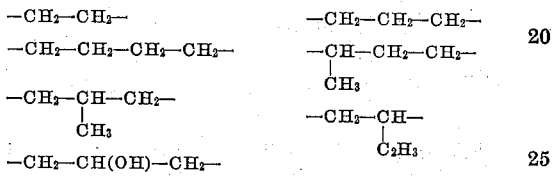

furthermore the n-hexylene radical may be used.

The alkylenediamines thus obtained, the two nitrogen atoms of which contain a 4-aminoquinolyl radical each, resemble in their chemotherapeutical properties, for instance, in the bactericidal and trypanocidal action, the compounds described in the U. S. application above referred to.

The following examples illustrate the invention, but they are not intended to limit it thereto:

1.

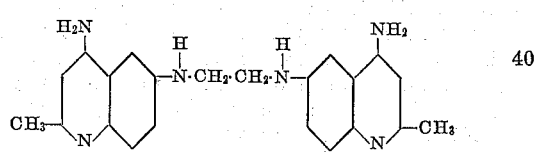

7 grams of 4.6-diaminoquinaldine are dissolved in 30 cc. of alcohol and the solution is heated in a sealed tube for 3 hours to 150° C. after addition of 3.5 grams of ethylene bromide. The contents of the tube is then dried, the remaining dark sirup is absorbed in hot water; the solution is clarified by filtration and mixed with strong caustic soda solution. The base of the above indicated constitution is thereby precipitated in the form of a resin which becomes solid after standing for a prolonged time. After recrystallization from alcohol and water it forms a pale-yellow powder which on heating to 300° C. sinters without melting, while assuming a dark coloration. On dissolving the base in hot dilute acetic acid, acidifying the solution with hydrochloric acid and mixing it with a solution of sodium chloride, the yellowish hydrochloride precipitates which, on heating it with water, readily dissolves with a dark yellow color.

2.

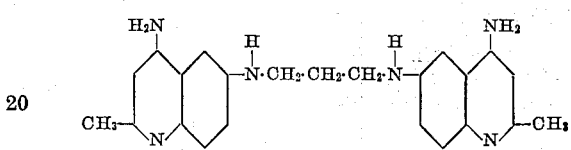

7 grams of 4,6-diaminoquinaldine are caused to react with 4 grams of trimethylene bromide in 30 cc. of alcohol as described in Example 1; the reaction product is also worked up in the same manner. The crude base of the above named constitution which forms a dark resin is dissolved in dilute acetic acid; the solution is rendered acid by addition of hydrochloric acid and the hydrochloride of the base is precipitated by the addition of a solution of sodium chloride. It forms a greyish-yellow powder which when heated with water readily dissolves to a yellow solution. The base is precipitated from the solution by means of caustic soda solution in the form of a flocculent grey precipitate. It changes at 115° C. into a foamy mass which gradually becomes a dark resin when further heated.

3.

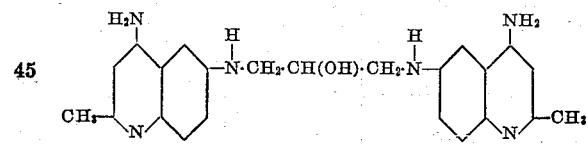

17.3 grams of 4,6-diaminoquinaldine are dissolved in 50 cc. of alcohol; after the addition of 5 cc. of water and 9.2 grams of epichlorhydrine, while occasionally heating it, the solution is allowed to stand for some hours. The solution whose appearance is unchanged is then heated in a sealed tube for 3 hours to 150° C. together with an additional 17.3 grams of 4,6-diaminoquinaldine. The semi-solid contents of the tube is then dissolved in hot dilute acetic acid and the solution is acidified with dilute hydrochloric acid. During this operation the hydrochloride of the above named compound separates as a precipitate which is scarcely colored. On heating it with water it dissolves to a yellow solution. The base precipitated by means of alkali forms, after recrystallization from methanol, a yellowish powder which decomposes at 289° C., while assuming a dark coloration.

4.

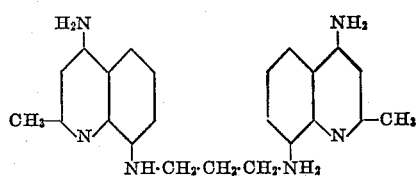

16.4 grams of 4.8-diaminoquinaldine (see Example 5 of the U. S. patent application above referred to) 80 cc. of ethanol and 9 grams of trimethylene bromide are heated together for 3 hours at 150° C. The whole is then evaporated to dryness, the dry residue is dissolved in boiling water and the solution is clarified by filtration. Caustic soda solution precipitates the above named new base from the solution in the form of a resin which solidifies on cooling. The base is dissolved in dilute hot acetic acid and after acidifying the solution with hydrochloric acid the hydrochloride of the base is precipitated by the addition of sodium chloride solution. The salt may be further purified by dissolving it and salting it out again. It forms a greenish-grey powder which dissolves in water to a dark yellow solution. The base which is precipitated by caustic soda solution forms a light-grey powder which melts, while foaming, at 145° C.

I claim:

1. The compounds of the following general formula:

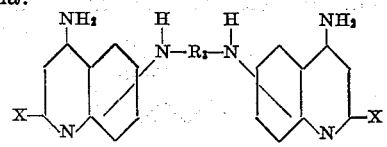

wherein X stands for a member of the group consisting of H and methyl, and R₃ for an alkylene radical with at least two carbon atoms, said products showing valuable therapeutic properties and forming water-soluble hydrochlorides.

2. The compounds of the following general formula:

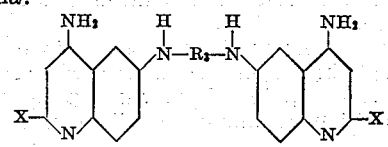

wherein X stands for a member of the group consisting of H and methyl, and R₃ for an alkylene radical with at least two carbon atoms, said products showing valuable therapeutic properties and forming water-soluble hydrochlorides.

3. The compounds of the following general formula:

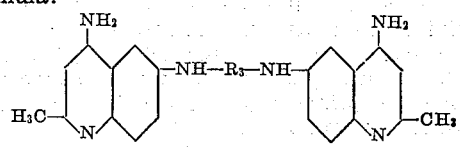

wherein R₃ stands for an alkylene radical of at least two carbon atoms, said products showing valuable therapeutic properties and forming water-soluble hydrochlorides.

4. The compound of the following formula:

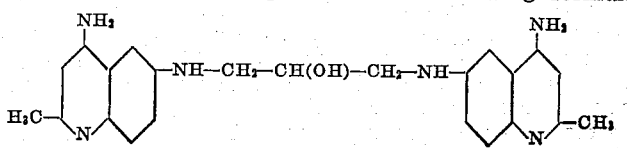

5. The compound of the following formula:
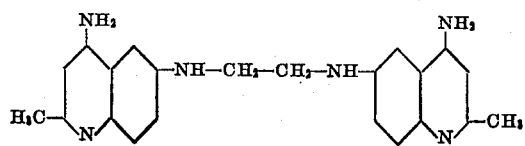
said product showing valuable therapeutic properties and forming a water-soluble hydrochloride.
6. The compound of the following formula:
said product showing valuable therapeutic properties and forming a water-soluble hydrochloride.
HEINRICH JENSCH.